Jan. 24, 1933.          B. F. JENSEN            1,895,127
                       ANIMAL BROODER
                  Filed Oct. 14, 1929          2 Sheets-Sheet 1

Inventor
Benton F. Jensen
By M. Talbert Dock
Attorney

Jan. 24, 1933.  B. F. JENSEN  1,895,127
ANIMAL BROODER
Filed Oct. 14, 1929   2 Sheets-Sheet 2

Inventor
Benton F. Jensen
By M. Talbert Dick
Attorney

Patented Jan. 24, 1933

1,895,127

UNITED STATES PATENT OFFICE

BENTON FRANKLIN JENSEN, OF EXIRA, IOWA

ANIMAL BROODER

Application filed October 14, 1929. Serial No. 399,629.

The principal object of this invention is to provide a heated brooder house for swine and the like that is so arranged and designed as to facilitate the accomplishment of the necessary chores by the animal raiser.

A further object of my invention is to provide an animal brooder house that reduces all fire hazards to a minimum.

A still further object of this invention is to provide a heated animal brooder house of a plurality of pens or compartments that uniformly heats all of the pens regardless of their proximity to the heat producing means.

A still further object of this invention is to provide a heated hog house that may easily be controlled relative to heat and one so constructed that there is no danger of burning any of the animals housed therein.

A still further object of my invention is to provide a heated hog house that may be easily converted to possess pens of various sizes.

A still further object of this invention is to provide a heated animal brooder house that permits the small animals to pass directly into the heating compartment from the larger pens.

A still further object of my invention is to produce a heated brooder house for various kinds of animals and especially swine that is economical in manufacture, durable in use and refined in appearance.

These and other objects will be apparent to those skilled in the art.

My invention consists in the construction, arrangement, and combination of the various parts of the device, whereby, the objects contemplated are attained as hereinafter more fully set forth, pointed out in my claims and illustrated in the accompanying drawings, in which:

Figure 1:
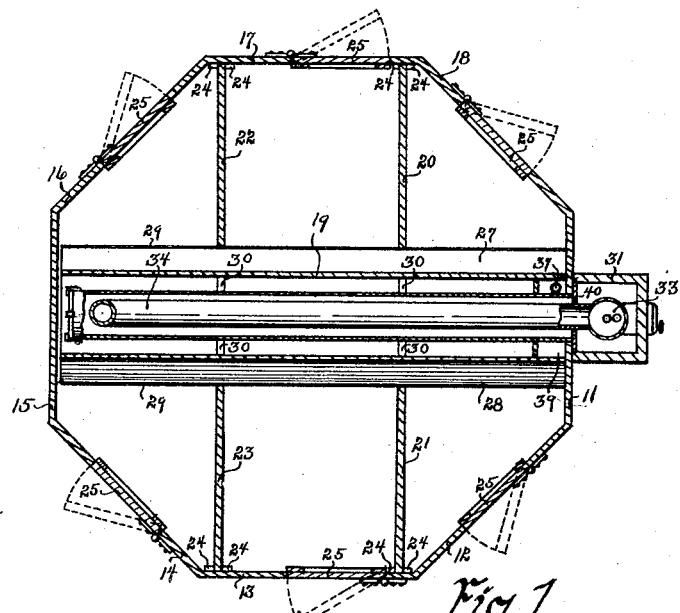
Fig. 1 is a top plan sectional view of the invention taken on line 1—1 of Fig. 2.

In raising animals such as hogs, it is very desirable to raise the pigs as early in the spring as possible in order to obtain high market prices. To do this it is necessary to provide adequate housing facilities for the animals. Hog houses are being manufactured today to accomplish this but some of these are objectionable on account of their unhandy arrangements, danger of fire by placing the stove in the center of the house, and uneven heating. I have overcome these objections as will be appreciated by those skilled in the art.

In the drawings I show a house especially designed for swine, but the principles illustrated may be used to equal advantage in the raising of other animals, fowls and the like.

I have used the numeral 10 to generally designate the animal house. This house may have any number of sides, but in the drawings I show eight sides which I have designated by the numerals 11, 12, 13, 14, 15, 16, 17, and 18. Extending from the side 11 to near the side 15, and divided in two equal pens as shown in Fig. 1, is the elongated heated compartment 19. Extending transversely to the elongated heated compartment and secured to that compartment and the side 17 near the corner formed by the sides 17 and 18 is the partition 20. Secured on the opposite side of the heated compartment and extending directly opposite from the partition 20 is a second partition 21, having its outer end secured to the side 13 near the corner formed by sides 12 and 13. Secured at one end by suitable means to the elongated heated compartment extending transversely thereof and having its other end secured by suitable means to the side 17 near the corner formed by the sides 16 and 17 is the partition 22. On the opposite side of the heated compartment, secured to the same and extending directly opposite from the partition 22 is the partition 23 secured by suitable means to the side 13 near the corner formed by the sides 13 and 14. By this construction six pens will be provided as shown in Fig. 1, and each will have approximately the same area of floor space. By the use of cleats 24 as shown in the drawings the partitions may be slid upwardly and out of engagement with the sides of the house and the heated compartment. By the removal of any one or all of these partitions, larger but fewer pens may be had. As a matter of fact the elongated heated compartment may also be removed from the house and in that case one single large pen inside the house will be provided. I have used the numeral 25 to designate a door in each side of the house 10. By entering one of the larger doors the animal raiser will have easy access to all pens as the elongated heated compartment and the partitions are only high enough to prevent the hogs from passing from one pen to the other.

The numeral 26 designates a trough formed on the top of the elongated heated compartment for the storing of buckets, feed, equipment and the like.

Figure 3:
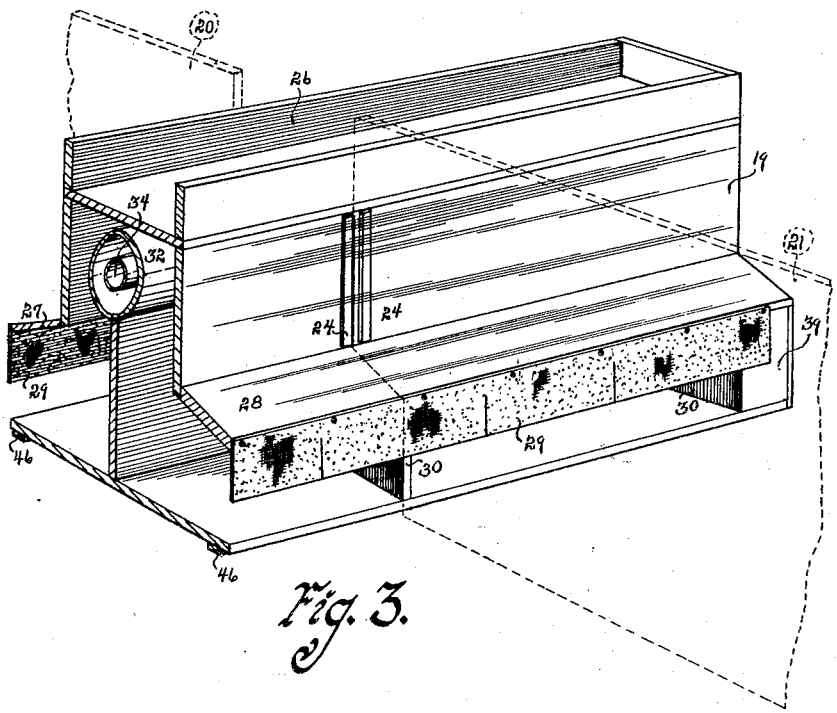
Fig. 3 is a perspective view of the elongated heating compartment extending through the brooder house.
Figure 4:
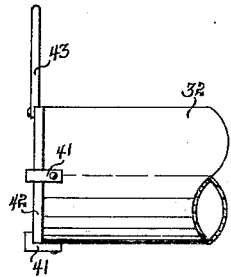
Fig. 4 is a side view of the end portion of the heat distributing pipe showing the gate valve for opening and for adjustably enclosing its open end.
Figure 5:
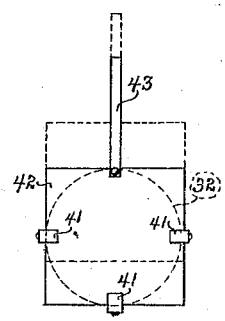
Fig. 5 is an end view of the gate valve shown in Fig. 4, with dotted lines to show its adjustment.

As seen from Fig. 3, the elongated heated compartment is hollow its entire length and its sides terminate a considerable distance above its floor. Extending outwardly and slightly downwardly from each of these sides at their lower marginal edge are the two guard boards 27 and 28, respectively. These guard boards not only prevent the mother animal from accidentally crushing one of the smaller animals between herself and the elongated compartment but provide a heating compartment of considerable floor area. Extending downwardly from each of the guard boards 27 and 28 is a strip of fabric 29 terminating a short distance above the floor of the elongated heated compartment. This fabric aids in retaining the heat inside the heated compartment and also allows the small animals ready access to the compartment. As the opening under the fabric extends completely across one side of each of the pens there is no danger of the small animal not being able to find and enter the heated compartment. To prevent any of the smaller animals in one pen from entering another pen through the elongated heated compartment, I have provided dividing boards 30 in the elongated heated compartment adjacent each of the partitions as shown in the drawings. This arrangement provides six rooms in the heated compartment to correspond with the six pens in the housing. The numeral 31 designates a stove embracing housing on the outside of the hog house and adjacent the side 11. Having one end communicating with the inside of the stove embracing housing and passing longitudinally through the heated or heating compartment 19 in its upper portion is the heat distributing pipe 32. This pipe is supported on the dividing member 30 and the vertical longitudinal dividing board in the center of the heating compartment which is a part of the same as shown in Fig. 3.

Figure 2:
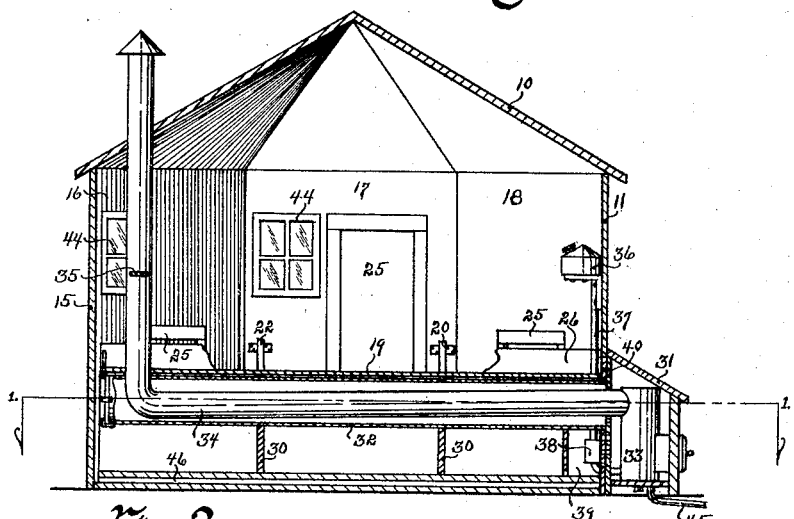
Fig. 2 is a side sectional view of my animal brooder house and more fully illustrates its interior construction.

Inside the housing 31 is the stove 33 shown in conventional form and having the smoke pipe 34. This smoke pipe passes through practically the entire length of the distributing pipe 32, and then upwardly inside the housing 10 and through its roof as shown in Fig. 2. The novelty of the arrangement of this smoke pipe and the heat distributing pipe is that as the smoke pipe progresses it travels closer and closer to the bottom of the heat distributing pipe as is thoroughly illustrated in Fig. 2. Naturally the closer the smoke pipe is to the heat distributing pipe the more heat it will transfer to the heat distributing pipe, and as a certain amount of heat from the smoke pipe is expended as it progresses this will be compensated for, by the fact that the smoke pipe assumes closer proximity to the distributing pipe as it progresses thereby uniformly and evenly heating the distributing pipe from one end to the other. The rapidity with which the smoke and heat pass through the smoke pipe may be regulated by the usual damper 35.

Any method for producing heat inside the stove 33 may be used. In the drawings I have shown equipment for a small oil burner. The numeral 36 represents a small oil burner tank inside of the housing 10. I placed this supply tank inside the housing 10 in order that the fuel oil will always be maintained at a warm temperature. The numeral 37 designates the usual fuel pipe leading to the oil burner inside the stove. To regulate the flame of the oil burner one may use a thermostat 38 shown in conventional form inside the small compartment 39 formed in the end of the heated compartment. To reduce fire hazards I have provided a metal fire wall 40 between the stove and the side 11. In order that heat radiated from the sides of the stove 33 may directly enter the heated compartment I have placed holes in the fire wall 40 and side 11 adjacent to it as shown in Fig. 2.

The numeral 41 designates brackets secured on the free end of the heat distributing pipe 32. Slidably mounted in these brackets 41 and over the open end of the heat distributing pipe is a gate valve 42 having the handle 43 to facilitate its manual operation. By the use of this gate valve the passing of the heat through the heat distributing pipe may be retarded to more fully heat the same or the gate valve may be adjustably opened and any amount or all of the heat allowed to pass out of the free end of the pipe 32 into the far end of the elongated heated compartment and the house 10. This construction provides a further adjusting means for heating the compartments and pens furthest away from the stove 33, at a similar temperature to that realized in the pens and compartments adjacent the stove. The numeral 44 designates windows in each of the sides 13, 14, 15, 16 and 17. No windows are used in the sides 11, 12 and 18, as it is desired that these three sides face the north.

By the stove being on the outside of the animal house, there is no danger of fire destroying the building and animals housed therein. In case the oil burner becomes extinguished the oil is designed to run out through the over-flow pipe 45. When a hot water system is used the hot water pipe should extend forth and back in the pipe 32. To prevent floor material from getting into the elongated heated compartment I have provided supports 46. Under the compartment as shown in Fig. 3, to hold the same a slight distance above the animal house floor.

There is no danger of the health and life of the animals being endangered by fumes or odors from the side of the stove 33 as the same is completely shrouded from communicating with the inside the housing 10.

The grown animal or animals naturally remain in the larger pens but the little animals attracted by the heat will pass into the heated compartment under the fabric 29 communicating with that particular pen. Enough of the heat, however, will pass out from under the fabric 29 to warm the larger pens for the larger animals.

Some changes may be made in the construction and arrangement of my improved combination animal brooder without departing from the real spirit and purpose of my invention, and it is my intention to cover by my claims any modified forms of structure or use of mechanical equivalents which may be reasonably included within their scope.

I claim:

1. In a device of the class described, a house, an elongated box member extending across the floor of said house, openings in each side of said box member for allowing the smaller animals access to said box member, a pen communicating with each of said openings, a heat distributing pipe supported in said elongated box member, a stove, a smoke pipe communicating with inside of said stove and passing through said heat distributing pipe; said smoke pipe progressively approaching closer to the bottom of the heat distributing pipe as the said smoke pipe extends from said stove, and a gate valve slidably mounted on said heat distributing pipe for permitting hot air from the same to pass into said elongated box member.

2. In a device of the class described, a house, an elongated box member extending across the floor of said house and dividing said house, door openings in each side of said box member, a heat distributing pipe supported in said elongated box member, a means for producing heat, a pipe communicating with said heat producing means and passing through said heat distributing pipe; said last mentioned pipe progressively approaching the bottom of said heat distributing pipe as it extends from said heat producing means, and a gate valve slidably mounted in said heat distributing pipe for permitting hot air from the same to pass into said elongated box member.

3. In a device of the class described, a house, an elongated box member extending across the inside of said house, door openings in the side of said box, a heat distributing pipe supported in said elongated box member, a stove, and a pipe of uniform diameter communicating with said stove and passing through said heat distributing pipe; said pipe leading from said stove progressively approaching the bottom of said heat distributing pipe as it extends from said stove.

BENTON FRANKLIN JENSEN.